April 7, 1942.　　　G. T. JACOCKS　　　2,278,881
PRESSURE VESSEL
Filed Feb. 17, 1939
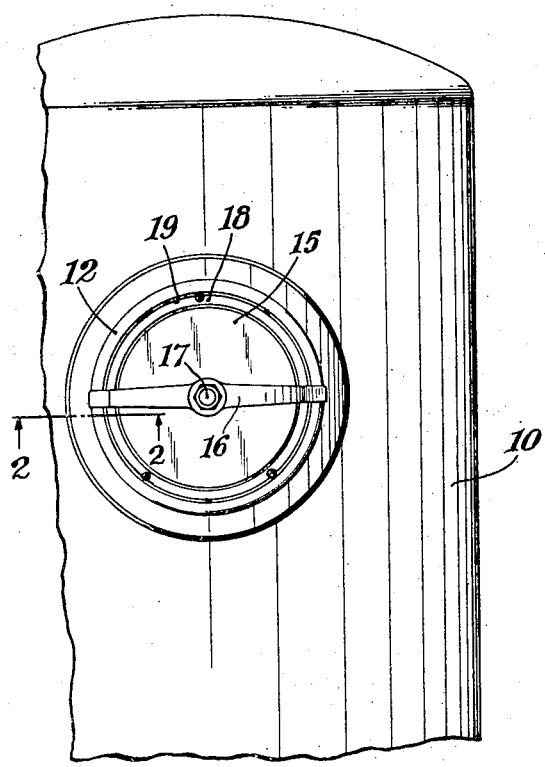
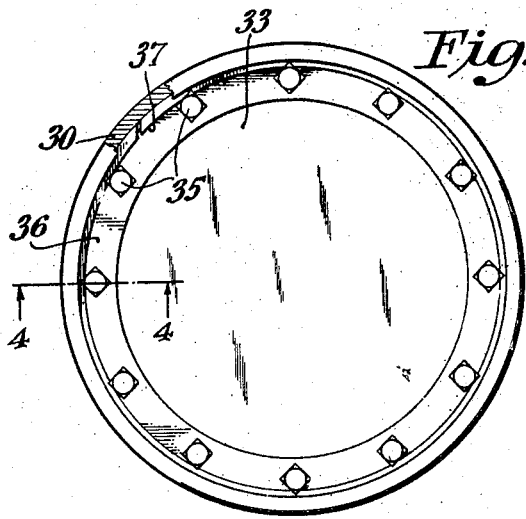
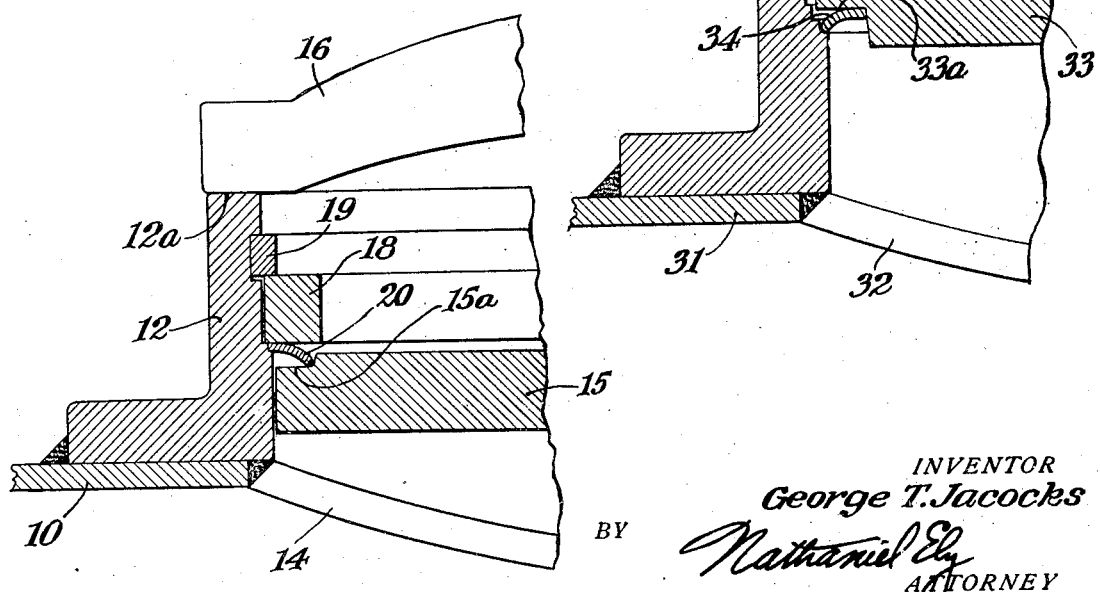
INVENTOR
George T. Jacocks
BY Nathaniel Ely
ATTORNEY Patented Apr. 7, 1942

2,278,881

UNITED STATES PATENT OFFICE 2,278,881

PRESSURE VESSEL

George T. Jacocks, Larchmont, N. Y., assignor to The Lummus Company, New York, N. Y., a corporation of Delaware Application February 17, 1939, Serial No. 256,934

1 Claim. (Cl. 220—46)

This invention relates to improvements in pressure vessels and more particularly to sealed openings therefor.

It is one of the principal objects of this invention to provide a pressure vessel with a sealed opening such as a manhole in which the opening can be sealed in a pressure tight manner and in which the sealing element can be easily removed.

Another object of the invention is to provide an improved type of joint between the cover and the manhole nozzle of a high pressure vessel in which the cover can be sealed with a pressure in excess of and independent of the securing pressure.

A still further object of the invention is to provide a less expensive and yet stronger opening and cover for a pressure vessel in which the cover is sealed by a cantilever type gasket, such gasket having one end fixed and the other end movable so that it creates a radial seal under axial compression by the cover, the cover being arranged to increase the sealing force due to the pressure within the vessel.

Further objects and advantages of the invention will appear from the following description of a preferred form of embodiment thereof taken in connection with the attached drawing in which:

Figure 1 is a side elevation of a pressure vessel having a manhole or similar sealed opening;

Figure 2 is a cross section through the manhole cover substantially on the line 2—2 thereof showing the internal construction;

Figure 3 is an elevation with parts in section of a modified form of manhole and cover; and Figure 4 is a cross section on the line 4—4 of Figure 3, showing the internal construction.

In accordance with the preferred form of embodiment of my invention, the pressure vessel 10 is conveniently provided with a manhole nozzle 12 which is suitably secured adjacent to the opening 14 in the vessel shell. In the preferred construction, the manhole nozzle 12 is adapted to be closed by cover 15 which may be supported as by a clevis or yoke 16, suitably bolted at 17 to the cover 15 with the ends resting on the periphery 12a of the manhole nozzle 12.

The cover 15 is conveniently held against outward movement by the one-piece bull ring 18 which is slidably carried within the nozzle 12 and is retained against displacement by the split ring 19 carried in a recess in the nozzle 12.

A gasket seal is maintained between the cover 15 and the bull ring 18 by the use of a gasket 20 which is preferably of a curved or arcuate cross section with one edge locked in position as by engagement of the outer edge between the continuous bull ring 18, and the recess in the wall of nozzle 12. The other edge of the gasket is preferably free and engages recess 15a in the cover 15, thereby bridging the gap between the nozzle and the cover in a form of cantilever gasket.

When the clevis bolt 17 is tightened, thereby drawing out the cover 15, there will be an axial compression of the gasket 20 which will cause radial movement of the edges against the channel formed by the bull ring 18 and the interior wall of the nozzle 12 on one edge, and the peripheral channel 15a on the cover 15 on the other edge. This bolt pressure will be augmented by the internal pressures on the cover if the vessel is of the super-atmospheric type, as such pressure will also tend to move the cover 15 outwardly and will tend to improve the gasket seal.

The gasket engaging portion of the channel 15a is preferably rounded to cooperate with a rounded inner edge of the gasket 20 so that on tightening there will be a rolling contact which will assure a tight seal without scoring. When the pressure is released, the gasket will tend to resume its original shape and it will then be possible to move the bull ring inwardly, remove the split ring 19, and thereafter remove the cover and gasket.

An advantage of the cantilever type gasket 20 is that the radially spaced edges contact with the respective members to be sealed so that there is a direct and positive closure of the joint. With this cantilever type gasket, one edge is immovable axially, but under the sealing loads the joint is sealed by a slight lateral movement due to the reaction of the other edge. No material clearance is required on the outer side, and yet assembly is comparatively easy as the curvature of the inner edge provides adequate clearance for the sealing movement of the cover. The curved surfaces do not become overstressed under sealing pressure and will not buckle, although the joint is repeatedly opened and closed. The amount of movement between open and closed position of the gasket is also relatively small thereby requiring a relatively small take-up to move the cover into its ultimate position. The movement will tend to establish an infinite sealing pressure due to the radial reaction of the gasket to lateral loads.

A modified form of construction is shown in

Figures 3 and 4 in which the nozzle 30 is adapted to be integrally secured to a vessel 31 normally operating under vacuum or conditions of low absolute pressure. Such vessel has an opening 32 which is closed by the cover 33. The gasket 34 is of the type shown in the prior form of construction and seals the cover 33 with respect to the nozzle 30, but on an inward movement of the cover. This may be initiated by a plurality of securing devices 35 conveniently carried in a suitable bull ring 36 which is locked within the nozzle 30 by the split ring 37. The securing devices 35 engage the top wall of the cover 33 and force the cover against the gasket 34 with the gasket being restrained against inward movement by a suitable recess integrally formed in the nozzle. Such recess conveniently has a curved shoulder to facilitate the rolling movement of the gasket on the nozzle.

As in the prior construction, the movement of the cover 33 against the gasket 34, will cause a radial movement of infinite pressure of the edges of the gasket to accomplish the desired seal. If the pressure is relieved, the edges of the gasket will break away so that the entire cover can be quickly disassembled. In this latter form, the sealing movement is almost entirely on the nozzle side of the gasket although a sealing reaction will eventually be made against the cover.

This latter form is preferable for vacuum vessels, inasmuch as the greater external pressure will tend to increase the effectiveness of the seal. It is of course obvious that it can be equally as well used on all pressure vessels if it is preferable to withdraw the cover without using the yoke arrangement shown in Figure 2. The word "pressure vessel" is intended to cover all types of vessels whether of vacuum or super-atmospheric type.

It will be apparent that this type of joint structure and gasket is adaptable for sealing any tubular shell with a cover whether it be a manhole or whether it be the end of the vessel itself. It is of particular economical advantage as expensive flanges are eliminated and all of the securing devices are within the periphery of the nozzle which may be only slightly larger than the actual opening in the vessel. The cover is of even smaller diameter than the nozzle as it is carried within the inner diameter thereof to which it is sealed by the gasket. The economy in structure will thus be apparent.

While I have shown a preferred form of embodiment of my invention, I am aware that other modifications can be made thereto and I therefore desire a broad interpretation of my invention within the scope and spirit of the disclosure herein and of the claim appended hereinafter.

I claim:

A pressure vessel having an opening in the wall thereof, a nozzle projecting from the vessel wall adjacent said opening, said nozzle having an internal shoulder thereon projecting into the opening, a cover of smaller external diameter than the internal diameter of said nozzle, said cover having a peripheral shoulder adjacent one edge, an annular gasket extending between the shoulder on said nozzle and the shoulder on said cover, said gasket being relatively flat from its outer edge to an intermediate part of its cross section and substantially curved through the remainder of its cross section, the flat edge of said gasket being relatively fixed and the curved edge of said gasket being relatively movable, a backing ring fitting within the wall of the opening and engaging the relatively flat edge of the gasket and anchoring the gasket as a cantilever, a detachable ring in shear relation with the internal wall of the opening to retain said backing ring in position, the free edge of the gasket having a rolling contact on the cover, detachable means engaging said nozzle and an adjustable member carried by said detachable means and reacting through said nozzle and engaging said cover, said adjustable member on adjustment forcing the cover against the gasket, and moving the free curved end thereof into a relatively straight position to establish sealing relation, said cover being freely movable outward whereby a superior internal pressure will tend to assist the straightening force on the gasket.

GEORGE T. JACOCKS.